United States Patent
Hall

(10) Patent No.: US 9,311,847 B2
(45) Date of Patent: Apr. 12, 2016

(54) DISPLAY SYSTEM HAVING MONITORING CIRCUIT AND METHODS THEREOF

(71) Applicant: Ultravision Technologies, LLC, Dallas, TX (US)

(72) Inventor: William Y. Hall, Dallas, TX (US)

(73) Assignee: Ultravision Technologies, LLC, Dallas, TX (US)

( * ) Notice: Subject to any disclaimer, the term of this patent is extended or adjusted under 35 U.S.C. 154(b) by 0 days.

(21) Appl. No.: 14/720,610

(22) Filed: May 22, 2015

(65) Prior Publication Data

US 2016/0019834 A1 Jan. 21, 2016

Related U.S. Application Data

(60) Provisional application No. 62/158,989, filed on May 8, 2015, provisional application No. 62/113,342, filed on Feb. 6, 2015, provisional application No. 62/093,157, filed on Dec. 17, 2014, provisional application No. 62/065,510, filed on Oct. 17, 2014, provisional application No. 62/025,463, filed on Jul. 16, 2014.

(51) Int. Cl.
*G09G 3/32* (2006.01)
*G06F 1/16* (2006.01)
(Continued)

(52) U.S. Cl.
CPC ............ *G09G 3/3208* (2013.01); *G06F 1/1601* (2013.01); *G06F 3/1446* (2013.01);
(Continued)

(58) Field of Classification Search
CPC .......... G09G 2300/026; G09G 3/1431; G09G 3/1438; G06F 11/30; G06F 11/3041; G06F 11/3062; G06F 3/1431; G06F 3/1438
See application file for complete search history.

(56) References Cited

U.S. PATENT DOCUMENTS

| 1,816,254 A | 7/1931 | Heath |
| 4,457,090 A | 7/1984 | McDonough |

(Continued)

FOREIGN PATENT DOCUMENTS

| CN | 201449702 U | 5/2010 |
| CN | 201540699 U | 8/2010 |

(Continued)

OTHER PUBLICATIONS

Daktronics, "The Smarter Approach to Digital Outdoor," Daktronics Digital Billboard Products, 2013, 16 pages.

(Continued)

*Primary Examiner* — Liliana Cerullo
(74) *Attorney, Agent, or Firm* — Slater & Matsil, L.L.P.

(57) ABSTRACT

A modular multi-panel display system includes a mechanical support structure, an array of light emitting diode (LED) display panels arranged in rows and columns and mounted to the mechanical support structure so as to form an integrated display. A receiver box is mounted to the mechanical support, where the receiver box is housed in a housing that is separate from housings of each of the led display panels. The receiver box includes a receiver card coupled to feed data to be displayed on the integrated display to a plurality of the led display panels, where the receiver box includes a network interface card configured to receive data from a control box disposed at a remote location. A monitoring circuit is disposed within the receiver box, where the monitoring circuit is configured to generate an operational data of the array of LED display panels, where the network interface card is configured to send the operational data from the monitoring circuit to a monitoring server.

28 Claims, 15 Drawing Sheets

(51) Int. Cl.

| | | |
|---|---|---|
| *G09G 3/34* | (2006.01) | |
| *G09G 3/20* | (2006.01) | |
| *G06F 3/14* | (2006.01) | |
| *G09F 13/22* | (2006.01) | |
| *G09F 15/00* | (2006.01) | |
| *G09G 3/00* | (2006.01) | |

(52) U.S. Cl.
CPC ............ *G09F 13/22* (2013.01); *G09F 15/0006* (2013.01); *G09G 3/006* (2013.01); *G09G 3/2096* (2013.01); *G09G 3/32* (2013.01); *G09G 3/3233* (2013.01); *G09G 3/3406* (2013.01); *G09G 3/3413* (2013.01); *G09G 3/3426* (2013.01); *G06F 2200/1612* (2013.01); *G09F 2013/222* (2013.01); *G09G 2300/026* (2013.01); *G09G 2310/024* (2013.01); *G09G 2310/0235* (2013.01); *G09G 2320/062* (2013.01); *G09G 2320/064* (2013.01); *G09G 2320/0633* (2013.01); *G09G 2320/0693* (2013.01); *G09G 2330/02* (2013.01); *G09G 2360/04* (2013.01); *G09G 2360/14* (2013.01); *G09G 2360/145* (2013.01); *G09G 2360/16* (2013.01); *G09G 2380/06* (2013.01)

(56) References Cited

U.S. PATENT DOCUMENTS

| | | | |
|---|---|---|---|
| 4,497,125 | A | 2/1985 | Hutchinson |
| 4,782,336 | A | 11/1988 | Bailey |
| 4,964,231 | A | 10/1990 | De Maat et al. |
| 5,172,504 | A | 12/1992 | De Maat et al. |
| 5,341,088 | A | 8/1994 | Davis |
| 5,523,769 | A | 6/1996 | Lauer et al. |
| 5,600,910 | A | 2/1997 | Blackburn |
| 5,722,767 | A | 3/1998 | Lin |
| 5,796,376 | A | 8/1998 | Banks |
| 5,900,850 | A | 5/1999 | Bailey et al. |
| 5,949,581 | A | 9/1999 | Kurtenbach et al. |
| 5,990,802 | A | 11/1999 | Maskeny |
| 6,045,240 | A | 4/2000 | Hochstein |
| 6,065,854 | A | 5/2000 | West et al. |
| 6,114,632 | A | 9/2000 | Planas, Sr. et al. |
| 6,175,342 | B1 | 1/2001 | Nicholson et al. |
| 6,237,290 | B1 | 5/2001 | Tokimoto et al. |
| 6,314,669 | B1 | 11/2001 | Tucker |
| 6,362,801 | B1 | 3/2002 | Yuhara |
| 6,414,650 | B1 | 7/2002 | Nicholson et al. |
| 6,570,548 | B2 | 5/2003 | Smith |
| 6,634,124 | B1 | 10/2003 | Bierschbach |
| 6,657,605 | B1 | 12/2003 | Boldt, Jr. et al. |
| 6,677,918 | B2 | 1/2004 | Yuhara et al. |
| 6,737,983 | B1 | 5/2004 | Temple |
| 6,741,222 | B1 | 5/2004 | Tucker |
| 6,810,612 | B2 | 11/2004 | Huang |
| 6,813,853 | B1 | 11/2004 | Tucker |
| 6,819,303 | B1 | 11/2004 | Berger et al. |
| 6,998,538 | B1 | 2/2006 | Fetterolf, Sr. et al. |
| 7,055,271 | B2 | 6/2006 | Lutz et al. |
| 7,072,407 | B2 | 7/2006 | Schurig |
| 7,086,188 | B2 | 8/2006 | Tsao |
| 7,091,933 | B2 | 8/2006 | McClintock et al. |
| 7,161,558 | B1 | 1/2007 | Eidem et al. |
| 7,170,480 | B2 | 1/2007 | Boldt, Jr. et al. |
| 7,204,602 | B2 | 4/2007 | Archer |
| 7,267,459 | B2 | 9/2007 | Matheson |
| 7,319,408 | B2 | 1/2008 | Temple |
| 7,334,361 | B2 | 2/2008 | Schrimpf et al. |
| 7,355,562 | B2 | 4/2008 | Schubert et al. |
| 7,450,085 | B2 | 11/2008 | Thielemans et al. |
| 7,495,576 | B2 | 2/2009 | Maskeny et al. |
| 7,502,950 | B1 | 3/2009 | Brands |
| 7,557,781 | B2 | 7/2009 | Chuang et al. |
| 7,605,772 | B2 | 10/2009 | Syrstad |
| 7,674,000 | B2 | 3/2010 | Valerio, Jr. et al. |
| 7,688,280 | B2 | 3/2010 | Callegari et al. |
| 7,694,444 | B2 | 4/2010 | Miller et al. |
| 7,703,941 | B2 | 4/2010 | Lee |
| 7,774,968 | B2 | 8/2010 | Nearman et al. |
| 7,779,568 | B2 | 8/2010 | Gettelfinger et al. |
| 7,797,865 | B2 | 9/2010 | Patel et al. |
| 7,868,903 | B2 | 1/2011 | Wendler et al. |
| 7,869,198 | B1 | 1/2011 | Nearman et al. |
| 7,907,133 | B2 | 3/2011 | Joffer et al. |
| 7,926,213 | B1 | 4/2011 | Kludt et al. |
| 7,950,174 | B2 | 5/2011 | Xu |
| 7,971,378 | B2 | 7/2011 | Campoy Odena |
| 8,007,121 | B2 | 8/2011 | Elliott et al. |
| 8,016,452 | B2 | 9/2011 | Dunn |
| 8,066,403 | B2 | 11/2011 | Sanfilippo et al. |
| 8,074,387 | B2 | 12/2011 | Mancuso |
| 8,081,145 | B2 | 12/2011 | Ronkholz et al. |
| 8,104,204 | B1 | 1/2012 | Syrstad |
| 8,111,208 | B2 | 2/2012 | Brown |
| 8,115,229 | B2 | 2/2012 | Christy |
| 8,122,627 | B2 | 2/2012 | Miller |
| 8,130,175 | B1 | 3/2012 | Joffer et al. |
| 8,136,279 | B1 | 3/2012 | Nearman et al. |
| 8,154,864 | B1 | 4/2012 | Nearman et al. |
| 8,156,672 | B2 | 4/2012 | Xu |
| 8,168,990 | B2 | 5/2012 | Christy |
| 8,172,097 | B2 | 5/2012 | Nearman et al. |
| 8,184,114 | B2 | 5/2012 | Oh et al. |
| 8,228,261 | B2 | 7/2012 | Callegari et al. |
| 8,281,344 | B1 | 10/2012 | Mathias |
| 8,301,939 | B2 | 10/2012 | Gloege et al. |
| 8,314,433 | B2 | 11/2012 | Christy |
| 8,344,410 | B2 | 1/2013 | Wendler et al. |
| 8,350,788 | B1 | 1/2013 | Nearman et al. |
| 8,362,696 | B2 | 1/2013 | Zheng |
| 8,414,149 | B2 | 4/2013 | Nearman |
| 8,434,898 | B2 | 5/2013 | Sanfilippo et al. |
| 8,552,928 | B2 | 10/2013 | Wendler et al. |
| 8,558,755 | B2 | 10/2013 | Kharrati et al. |
| 8,599,108 | B2 | 12/2013 | Kline et al. |
| 8,604,509 | B2 | 12/2013 | Wendler et al. |
| 8,648,774 | B2 | 2/2014 | Kline et al. |
| 8,702,048 | B2 | 4/2014 | Kludt et al. |
| 8,714,665 | B2 | 5/2014 | Campagna et al. |
| 8,766,880 | B2 | 7/2014 | Kharrati et al. |
| 8,803,766 | B2 | 8/2014 | Kline et al. |
| 8,824,124 | B1 | 9/2014 | Carlson et al. |
| 8,824,125 | B1 | 9/2014 | Cox et al. |
| 2001/0037591 | A1 | 11/2001 | Nicholson et al. |
| 2002/0126086 | A1 | 9/2002 | Takeuchi et al. |
| 2002/0176267 | A1 | 11/2002 | Tanaka et al. |
| 2003/0146882 | A1 | 8/2003 | Ogino et al. |
| 2003/0158886 | A1* | 8/2003 | Walls ............... G06F 3/14 709/201 |
| 2004/0008155 | A1 | 1/2004 | Cok |
| 2004/0196049 | A1 | 10/2004 | Yano et al. |
| 2004/0222941 | A1 | 11/2004 | Wong et al. |
| 2005/0052374 | A1 | 3/2005 | Devos et al. |
| 2005/0052375 | A1 | 3/2005 | Devos et al. |
| 2005/0078104 | A1 | 4/2005 | Matthies et al. |
| 2005/0134526 | A1 | 6/2005 | Willem et al. |
| 2005/0178034 | A1 | 8/2005 | Schubert et al. |
| 2005/0189311 | A1 | 9/2005 | Colby et al. |
| 2005/0190520 | A1 | 9/2005 | Schomaker et al. |
| 2005/0264471 | A1 | 12/2005 | Yamazaki et al. |
| 2006/0031720 | A1* | 2/2006 | Choi ............... G06F 11/0745 714/43 |
| 2006/0039142 | A1 | 2/2006 | Temple |
| 2006/0132048 | A1 | 6/2006 | Popovich |
| 2006/0164587 | A1 | 7/2006 | Oh |
| 2006/0185612 | A1 | 8/2006 | Bonner et al. |
| 2006/0241878 | A1 | 10/2006 | Jung et al. |
| 2006/0256033 | A1 | 11/2006 | Chan et al. |
| 2007/0000849 | A1 | 1/2007 | Lutz et al. |
| 2007/0279314 | A1 | 12/2007 | Brown |
| 2008/0047184 | A1 | 2/2008 | Dean |
| 2008/0078733 | A1 | 4/2008 | Nearman et al. |
| 2008/0141571 | A1 | 6/2008 | Kottwitz |

(56) References Cited

U.S. PATENT DOCUMENTS

| | | |
|---|---|---|
| 2008/0266206 A1 | 10/2008 | Nelson et al. |
| 2008/0285087 A1* | 11/2008 | Perkins et al. ............... 358/400 |
| 2008/0303747 A1 | 12/2008 | Velicescu |
| 2009/0024929 A1 | 1/2009 | Gloege et al. |
| 2009/0073080 A1 | 3/2009 | Meersman et al. |
| 2009/0096711 A1 | 4/2009 | Jang et al. |
| 2009/0146910 A1 | 6/2009 | Gardner |
| 2009/0146919 A1 | 6/2009 | Kline et al. |
| 2009/0147028 A1 | 6/2009 | Sefton et al. |
| 2009/0251391 A1 | 10/2009 | Ng et al. |
| 2009/0289160 A1 | 11/2009 | Kludt et al. |
| 2009/0322251 A1 | 12/2009 | Hilgers |
| 2010/0123732 A1 | 5/2010 | Jenks et al. |
| 2010/0251583 A1 | 10/2010 | Brown et al. |
| 2010/0288895 A1 | 11/2010 | Shamie |
| 2010/0295424 A1 | 11/2010 | Alexander |
| 2010/0309185 A1 | 12/2010 | Koester et al. |
| 2011/0025696 A1 | 2/2011 | Wyatt et al. |
| 2011/0096568 A1 | 4/2011 | Schattinger et al. |
| 2011/0134640 A1 | 6/2011 | Bertele |
| 2011/0168653 A1 | 7/2011 | Garrett et al. |
| 2011/0205757 A1 | 8/2011 | Whyte |
| 2011/0267328 A1 | 11/2011 | Venkatasubramanian et al. |
| 2012/0005563 A1 | 1/2012 | Gloege et al. |
| 2012/0019490 A1 | 1/2012 | Huang |
| 2012/0021873 A1 | 1/2012 | Brunner |
| 2012/0062540 A1 | 3/2012 | Quadri et al. |
| 2012/0112235 A1 | 5/2012 | Preuschl et al. |
| 2012/0218753 A1 | 8/2012 | Joffer et al. |
| 2012/0218758 A1 | 8/2012 | Wang et al. |
| 2012/0236509 A1 | 9/2012 | Cope et al. |
| 2012/0248950 A1 | 10/2012 | Nibori |
| 2012/0299480 A1 | 11/2012 | Peting et al. |
| 2013/0002634 A1 | 1/2013 | Wendler et al. |
| 2013/0182440 A1 | 7/2013 | Ferrie et al. |
| 2013/0271973 A1 | 10/2013 | Rycyna, III |
| 2013/0279161 A1 | 10/2013 | Pickard et al. |
| 2013/0321387 A1* | 12/2013 | Ohe ..................... G09G 5/10 345/214 |
| 2014/0259645 A1 | 9/2014 | Cox et al. |
| 2014/0267784 A1* | 9/2014 | Rykowski ............ G09G 3/006 348/189 |
| 2014/0267896 A1 | 9/2014 | Cox et al. |
| 2015/0145851 A1* | 5/2015 | Takeda et al. ................ 345/212 |
| 2015/0205565 A1* | 7/2015 | Koguchi ....................... 345/1.3 |

FOREIGN PATENT DOCUMENTS

| | | |
|---|---|---|
| CN | 202383944 U | 8/2012 |
| WO | 2005083660 | 9/2005 |
| WO | 2014005600 | 1/2014 |

OTHER PUBLICATIONS

Daktronics, "Daktronics LED Billboard Technology," www.daktronics.com Nov. 14, 2013, 3 pages.

Ekta, "WOWStrip," www.ekta-led.com, Jun. 19, 2014, 5 pages.

"What is IP? Explained: Ingress Protection rating (IP Rating, IP65-IP68) system," Waterproof TVs Direct; Apr. 11, 2012; http://waterproftvs-direct.co.uk/blog/waterproof-tv/what-is-ip-ip-explained-ingress-protection-rating-ip-rating-ip65-ip68-system.

WOWstrip Semi-Transparent LED Displays product page, http://www.ekta-led.com/prod/68/17/190/, retrieved Jun. 19, 2014, 3 pages.

\* cited by examiner

DISPLAY SYSTEM HAVING MONITORING CIRCUIT AND METHODS THEREOF

The present application claims priority to the following applications: U.S. Provisional Application 62/158,989 filed on May 8, 2015, U.S. Provisional Application 62/113,342 filed on Feb. 6, 2015, U.S. Provisional Application No. 62/093,157, filed on Dec. 17, 2014, U.S. Provisional Application No. 62/065,510, filed on Oct. 17, 2014, U.S. Provisional Application No. 62/025,463, filed on Jul. 16, 2014. These applications are incorporated herein by reference.

TECHNICAL FIELD

The present invention relates generally to a display panels and systems, and, in particular embodiments, to display system having modular display panel with circuitry for bidirectional communication.

BACKGROUND

Large displays (e.g., billboards), such as those commonly used for advertising in cities and along roads, generally have one or more pictures and/or text that are to be displayed under various light and weather conditions. As technology has advanced and introduced new lighting devices such as the light emitting diode (LED), such advances have been applied to large displays. An LED display is a flat panel display, which uses an array of light-emitting diodes. A large display may be made of a single LED display or a panel of smaller LED panels. LED panels may be conventional panels made using discrete LEDs or surface-mounted device (SMD) panels. Most outdoor screens and some indoor screens are built around discrete LEDs, which are also known as individually mounted LEDs. A cluster of red, green, and blue diodes, or alternatively, a tri-color diode, is driven together to form a full-color pixel, usually square in shape. These pixels are spaced evenly apart and are measured from center to center for absolute pixel resolution.

Many LED display manufacturers sell displays with different resolutions. A present disadvantage of these LED displays is that each one must be a different size to accommodate the pitch needed to obtain the desired resolution. In turn, the existing cabinets and mounting structures must be built to be suitable with the size of the displays.

SUMMARY

In accordance with an embodiment of the present invention, a modular multi-panel display system includes a mechanical support structure, an array of light emitting diode (LED) display panels arranged in rows and columns and mounted to the mechanical support structure so as to form an integrated display. A receiver box is mounted to the mechanical support, where the receiver box is housed in a housing that is separate from housings of each of the led display panels. The receiver box includes a receiver card coupled to feed data to be displayed on the integrated display to a plurality of the led display panels, where the receiver box includes a network interface card configured to receive data from a control box disposed at a remote location. A monitoring circuit is disposed within the receiver box, where the monitoring circuit is configured to generate an operational data of the array of LED display panels, where the network interface card is configured to send the operational data from the monitoring circuit to a monitoring server.

In accordance with another embodiment of the present invention, a modular multi-panel display system includes a mechanical support structure, and an array of led display panels arranged in rows and columns and mounted to the mechanical support structure so as to form an integrated display. Each of the array LED display panels includes a network interface card configured to receive data from a control box disposed at a remote location. Each of the array LED display panels includes a network interface card coupled to feed data to be displayed on the integrated display. Each of the array LED display panels includes a monitoring circuit configured to generate an operational data for the corresponding led display panel, where the network interface card is configured to send the operational data from the monitoring circuit to a monitoring server.

In accordance with another embodiment of the present invention, a method of maintaining a modular multi-panel display includes a mechanical support structure and a plurality of LED display panels detachably coupled to the mechanical support structure without a cabinet, where each led display panel has a data port that is bidirectionally coupled to at least one other LED display panel and includes a power supply coupled to a power line that extends along a group of the led display panels. The method further includes monitoring the power supply of each LED display panel, and determining that a defective LED display panel has a defect by determining that the power supply of the defective led display panel is not converting power.

In accordance with another embodiment of the present invention, a method of maintaining a modular multi-panel display includes a mechanical support structure and a plurality of LED display panels detachably coupled to the mechanical support structure without a cabinet. Each led display panel has a data port that is bidirectionally coupled to at least one other LED display panel. The method further includes monitoring power consumption of each LED pixel in each LED display panel and determining that a defective LED display panel has a defective LED pixel based upon a result of the monitoring.

BRIEF DESCRIPTION OF THE DRAWINGS

For a more complete understanding, reference is now made to the following description taken in conjunction with the accompanying drawings in which:

FIGS. 7A and 7B, illustrates a display panel in accordance with an embodiment of the present invention, wherein FIG. 7A illustrates a cross-sectional view of a display panel while FIG. 7B illustrates a system diagram schematic of the display panel in accordance with an embodiment of the present invention;

DETAILED DESCRIPTION OF ILLUSTRATIVE EMBODIMENTS

In the following discussion, exterior displays are used herein for purposes of example. It is understood that the present disclosure may be applied to lighting for any type of interior and/or exterior display.

Installation of large display panels is a labor intensive process requiring skilled labor working in dangerous conditions for extended times. For example, to install a conventional display on a large multi-story building, the installers have to climb to the mounting wall (typically many stories high) and individually screw in each display and the corresponding cables etc. This is both time consuming and poses a significant safety threat thereby increasing the cost of the system dramatically.

Further, it is very difficult to know when a panel becomes defective. Typically, an observer or a customer has to take notice and inform the operator of the billboard when one or more panels are not functioning or functioning poorly. Embodiments of the present invention overcome these and other limitations by enabling bidirectional communication in which the billboard includes intelligence to initiate the replacement.

Further, when a particular display becomes defective during operation, the cost of replacement can be very high due to need for a highly skilled person to work in such difficult working conditions. The defective display has to be individually removed and replaced from the housing or cabinet in which it is mounted.

Embodiments of the invention provide preassembled display panel units, each of which provides a completely self-contained building block that is lightweight. Consequently, replacement of defective units is very simple and a person with no skill can easily remove and replace a defective display. Accordingly, embodiments of the present invention significantly reduce the operating cost of the display.

These display units are designed to be weather proof, without a heavy cabinet, although it is understood that the present disclosure may be applied to lighting for any type of interior and/or exterior display. The lightweight design allows for easier installation and maintenance, thus lowering total cost of ownership.

Embodiments of the invention provide building block panels that are configurable with future expandability. These displays can offer complete expandability to upgrade in the future without having to replace the entire display. Installation is fast and easy with very little down-time, which allows any electronic message to be presented more quickly.

In various embodiments, the display panels are "hot swappable." By removing one screw in each of the four corners of the panel, servicing the display panel is fast and easy. Since a highly-trained, highly-paid electrician or technician is not needed to correct a problem, cost benefits can be achieved.

Embodiments of the invention relate to lighting systems and, more particularly, to multi-panel lighting systems for providing interior or exterior displays.

Figure 1:
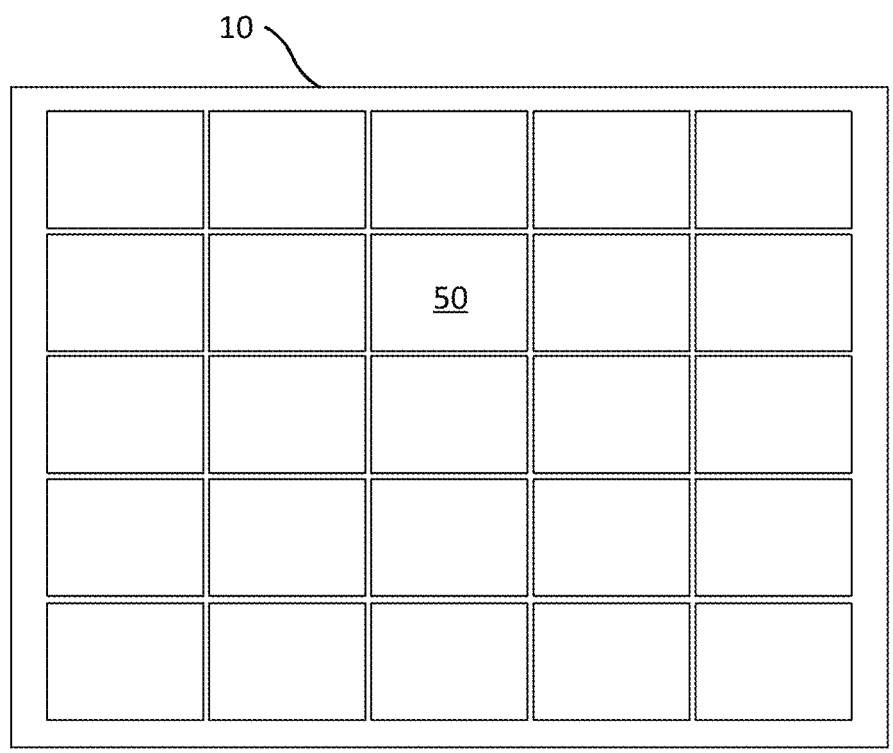
FIG. 1 illustrates a modular display panel in accordance with an embodiment of the present invention.
Figure 2:
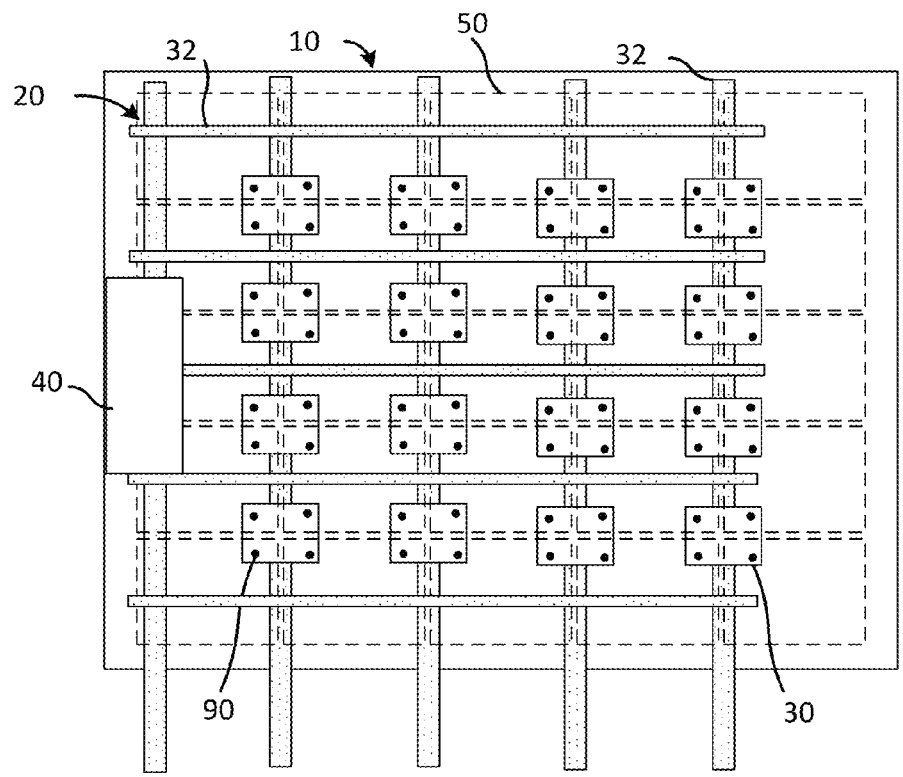
FIG. 2 illustrates a modular display panel attached to a supporting frame in accordance with an embodiment of the present invention.
Figure 3:
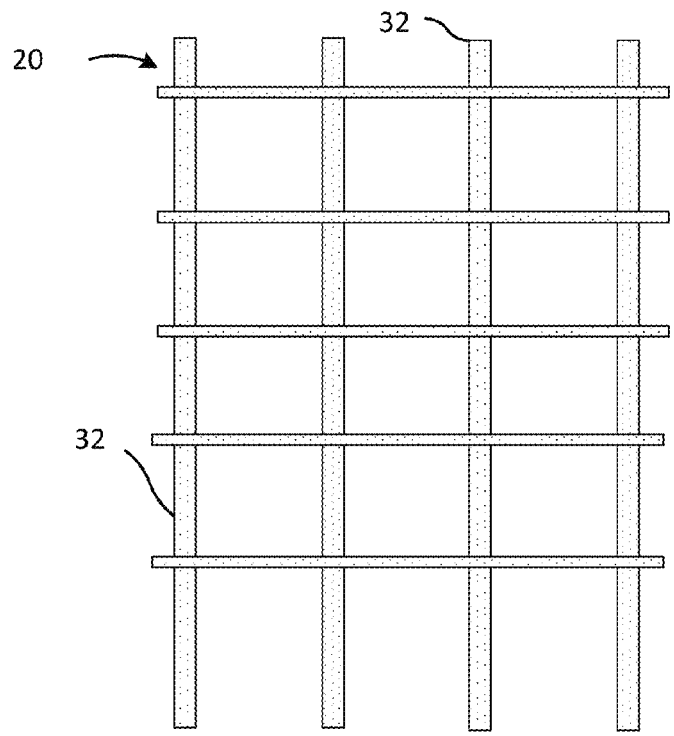
FIG. 3 illustrates a frame used to provide mechanical support to the modular display panel in accordance with an embodiment of the present invention.

FIG. 1 illustrates a modular display panel in accordance with an embodiment of the present invention. FIG. 2 illustrates a modular display panel attached to a supporting frame in accordance with an embodiment of the present invention. FIG. 3 illustrates a frame used to provide mechanical support to the modular display panel in accordance with an embodiment of the present invention.

The multi-panel modular preassembled display unit 10 comprises a plurality of LED display panels 50. In various embodiments describe herein, the light emitting diode (LED) display panels 50 are attached to a frame 20 or skeletal structure that provides the framework for supporting the LED display panels 50. The LED display panels 50 are stacked next to each other and securely attached to the frame 20 using attachment plate 30, which may be a corner plate in one embodiment. The attachment plate 30 may comprise holes through which attachment features 90 may be screwed in, for example.

In various embodiments, the preassembled display unit 10 may be used in a window display, billboard display, or other types of displays such as video walls, personal display screens and others. The preassembled display unit 10 may be sound enabled, for example, coupled to a common sound system in some embodiments. The sound system may be activated or deactivated depending on external conditions such as the presence of a user in some embodiments.

Referring to FIGS. 1 and 2, the LED display panels 50 are arranged in an array of rows and columns. Each LED display panel 50 of each row is electrically connected to an adjacent LED display panel 50 within that row.

Referring to FIG. 3, the frame 20 provides mechanical support and electrical connectivity to each of the LED display panels 50. The frame 20 comprises a plurality of beams 32 forming the mechanical structure. The frame 20 comprises a top bar, a bottom bar, a left bar, a right bar, and a plurality of vertical bars extending from the top bar to the bottom bar, the vertical bars disposed between the left bar and the right bar. The top bar, the bottom bar, the left bar and the right bar comprise four inch aluminum bars and wherein the vertical bars comprise 2"×4"×½" aluminum tubes. The top bar, the bottom bar, the left bar and the right bar are each capable of bearing a load of 1.738 lb/ft and the vertical bars are each capable of bearing a load of 3.23 lb/ft.

The size of the individual panels may vary, for example, may be 2 ft×3 ft, 3 ft×4 ft, as examples. For example, a display system could include 336 panels that are each 1'×2' in dimension to create a 14'×48' display. In such a display, because each panel is lighter than typical panels, the entire display could be built to weigh only 5500 pounds. This compares favorably to commercially available displays of the size, which generally weigh from 10,000 to 12,000 pounds. In another embodiment, a display system could include 320 LED display panels 50 arranged in ten rows and thirty-two columns so that the integrated display panel 100 has a display surface that is approximately fifty feet and four inches wide and fifteen feet and eight and three-quarters inches high. In other embodiments, displays with an arbitrary number of panels can be used.

The frame 20 may include support structures for the electrical cables, data cables, electrical power box powering the LED display panels 50, data receiver box controlling power, data, and communication to the LED display panels 50.

However, the frame 20 does not include any additional enclosures to protect the LED panels, data, power cables from the environment. Rather, the frame 20 is exposed to the elements and further exposes the LED display panels 50 to the environment. The frame 20 also does not include air conditioning, fans, heating units to maintain the temperature of the LED display panels 50. Rather, the LED display panels 50 are hermetically sealed themselves and are designed to be exposed to the outside ambient. Further, in various embodiments, there are no additional cabinets that are attached to the frame 20 or used for housing the LED display panels 50. Accordingly, in various embodiments, the multi-panel modular preassembled display unit 10 is designed to be only passively cooled.

Figure 4:
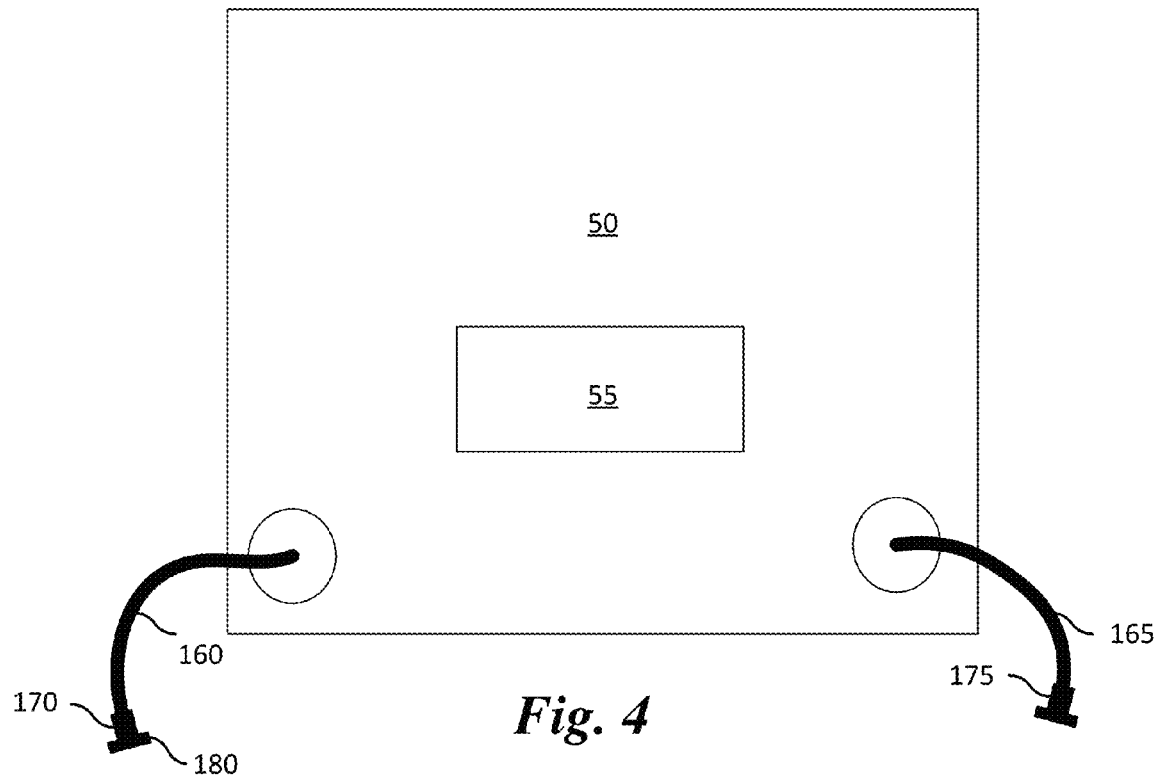
FIG. 4 illustrates one LED display panel of the multi-panel modular preassembled display unit comprising an input cable and an output cable.

FIG. 4 illustrates one LED display panel 50 of the multi-panel modular preassembled display unit 10 comprising an input cable 160 and an output cable 165. The LED display panels 50 are electrically connected together for data and for power using the input cable 160 and the output cable 165.

Each modular LED display panel 50 is capable of receiving input using an integrated data and power cable from a preceding modular LED display panel and providing an output using another integrated data and power cable to a succeeding modular LED display panel. Each cable ends with an endpoint device or connector, which is a socket or alternatively a plug.

Referring to FIG. 4, in accordance with an embodiment, a LED display panel 50 comprises an attached input cable 160 and an output cable 165, a first connector 170, a second connector 175, a sealing cover 180. The sealing cover 180 is configured to go over the second connector 175 thereby hermetically sealing both ends (first connector 170 and the second connector 175). The sealing cover 180, which also includes a locking feature, locks the two cables together securely. The input cable 160 and the output cable 1365 comprise integrated data and power wires with appropriate insulation separating them.

Figure 5:
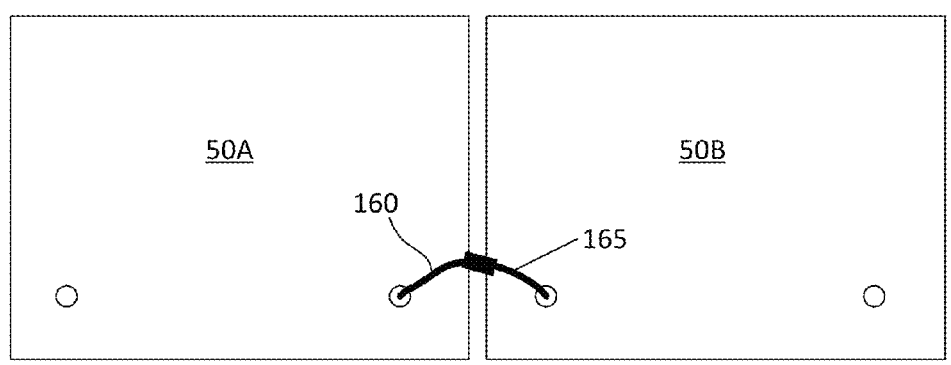
FIG. 5 illustrates two display panels next to each other and connected through the cables such that the output cable of the left display panel is connected with the input cable of the next display panel.

FIG. 5 illustrates two display panels next to each other and connected through the cables such that the output cable 165 of the left display panel 50A is connected with the input cable 160 of the next display panel 50B. The sealing cover 180 locks the two cables together as described above.

Figure 6:
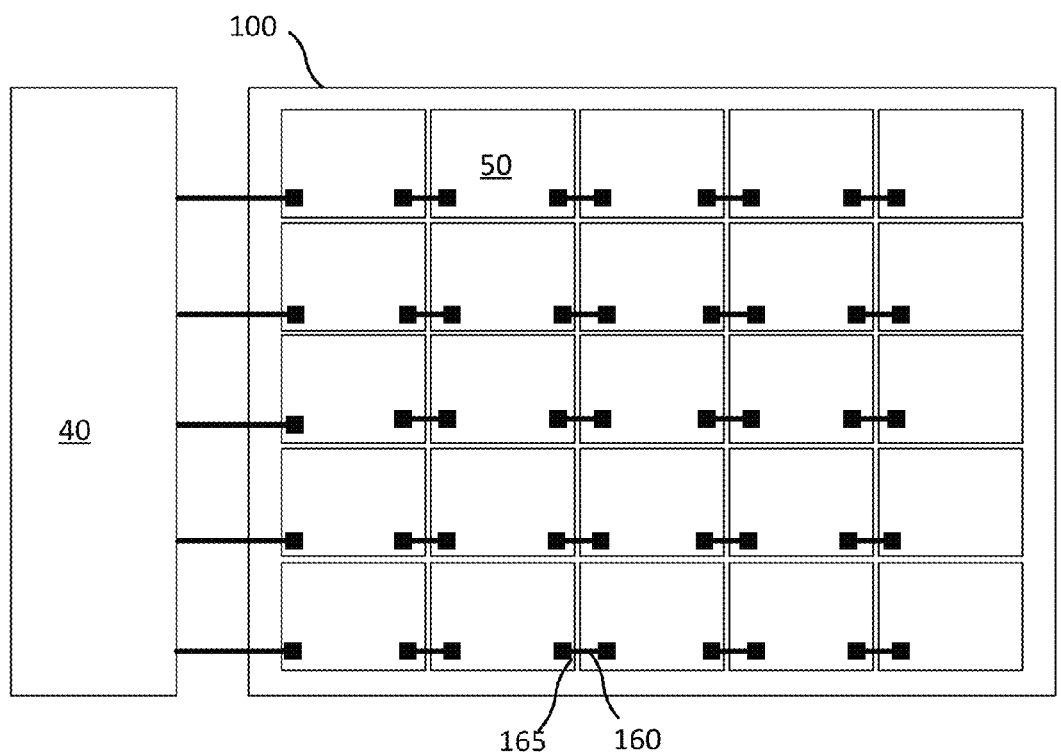
FIG. 6 illustrates a modular multi-panel display system comprising a plurality of LED display panels connected together using the afore-mentioned cables.

FIG. 6 illustrates a modular multi-panel display system comprising a plurality of LED display panels connected together using the afore-mentioned cables.

Referring to FIG. 6, for each row, a LED display panel 50 at a first end receives an input data connection from a data source and has an output data connection to a next LED display panel in the row. Each further LED display panel 50 provides data to a next adjacent LED display panel until a LED display panel 50 at second end of the row is reached. The power line is run across each row to power the LED display panels 50 in that row.

In one embodiment, the plurality of LED display panels 50 are arranged in ten rows and thirty-two columns so that the integrated display panel 100 has a display surface that is approximately fifty feet and four inches wide and fifteen feet and eight and three-quarters inches high.

In various embodiments, as illustrated in FIGS. 2 and 6, a data receiver box 40 is mounted to the mechanical support structure or frame 20. The data receiver box 40 is configured to provide power, data, and communication to the LED display panels 50. With a shared data receiver box 40, the panels themselves do not need their own receiver card. This configuration saves cost and weight.

Figure 7A:
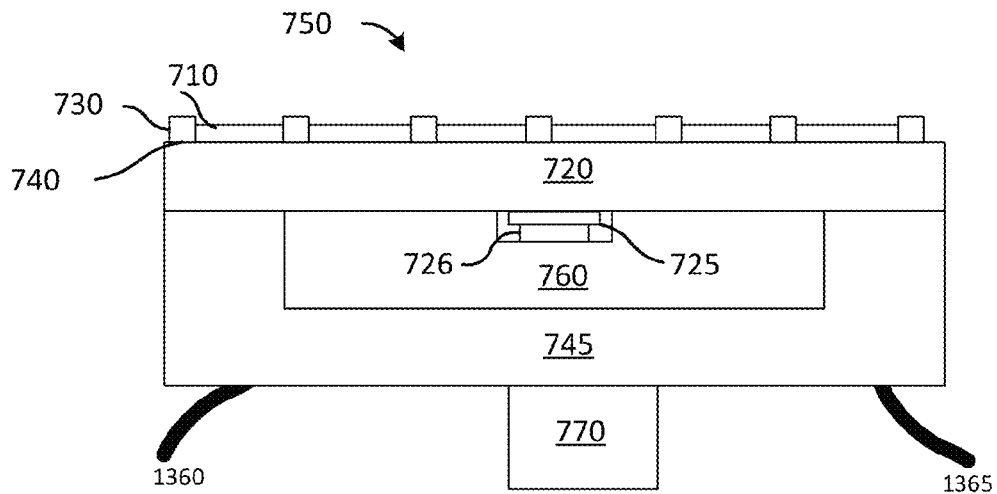
Figure 7B:
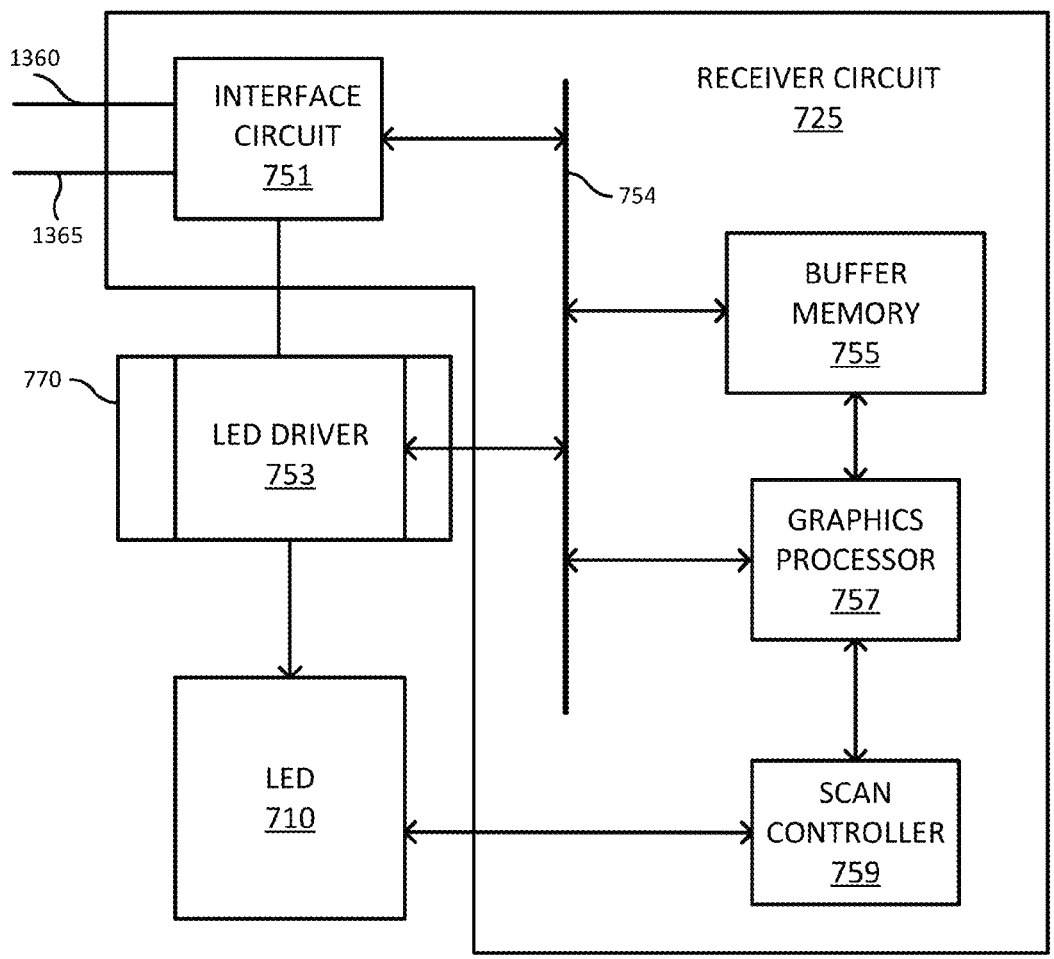

FIGS. 7A and 7B, illustrates a display panel in accordance with an embodiment of the present invention. FIG. 7A illustrates a cross-sectional view of a display panel while FIG. 7B illustrates a schematic of the display panel.

Referring to FIG. 7A, the modular LED display panel comprises a plurality of LEDs 710 mounted on one or more printed circuit boards (PCBs) 720, which are housed within a hermetically sealed enclosure or casing. A framework of louvers 730 is attached to the PCB 720 using an adhesive 740, which prevents moisture from reaching the PCB. However, the LEDs 710 are directly exposed to the ambient in the direction of light emission. The LEDs 710 themselves are water repellent and therefore are not damaged even if exposed to water. The louvers 730 rise above the surface of the LEDs and help to minimize reflection and scattering of external light, which can otherwise degrade the quality of light output from the LEDs 710.

The PCB is mounted within a cavity of an enclosure, which may be a plastic casing 745. A heat sink 760 is attached between the PCB 720 and the casing 745 and contacts both the PCB 720 and the casing 745 to maximize heat extraction. A thermal grease may be used between the back side of the casing 745 and the PCB 720 to improve thermal conduction. In one example embodiment, the thermal grease is between the heat sink 760 and the back side of the casing 745. In a further example embodiment, the thermal grease is between the PCB 720 and the heat sink 760.

A receiver circuit 725 is mounted on the PCB 1620. The receiver circuit 725 may be a single chip in one embodiment. Alternatively, multiple components may be mounted on the PCB 720. The receiver circuit 725 may be configured to process the received media and control the operation of the individual LEDs 710. For example, the receiver circuit 725 may determine the color of the LED to be displayed at each location (pixel). Similarly, the receiver circuit 725 may determine the brightness at each pixel location, for example, by controlling the current supplied to the LED.

The air gap within the cavity is minimized so that heat is conducted out more efficiently. Thermally conductive standoffs 726 may be introduced between the PCB 720 to minimize the air gap, for example, between the receiver circuit 725 and the heat sink 760. The PCB 720 is designed to maximize heat extraction from the LEDs 710 to the heat sink 760. As described previously, the casing 745 of the display panel 750 has openings through which an input cable 1360 and output cable 1365 may be attached. The cables may have connectors or plugs for connecting to an adjacent panel or alternatively the casing 745 may simply have input and output sockets.

A power supply unit 770 may be mounted over the casing 745 for powering the LEDs 710. The power supply unit 770 may comprise a LED driver in various embodiments. The LED driver may include a power converter for converting AC to DC, which is supplied to the LEDs 710. Alternatively, the LED driver may comprise a down converter that down converts the voltage suitable for driving the LEDs 710. For example, the down converter may down convert a DC voltage at a first level to a DC voltage at a second level that is lower than the first level. This is done so that large DC currents are not carried on the power cables. The LED driver is configured to provide a constant DC current to the LEDs 710.

Examples of down converters (DC to DC converters) include linear regulators and switched mode converters such as buck converters. In further embodiments, the output from the power supply unit 770 is isolated from the input power. Accordingly, in various embodiments, the power supply unit 770 may comprise a transformer. As a further example, in one or more embodiments, the power supply unit 770 may comprise a forward, half-bridge, full-bridge, push-pull topologies.

The power supply unit 770 may be placed inside a Faraday cage to minimize RF interference to other components. The LED driver of the power supply unit 770 may also include a control loop for controlling the output current. In various embodiments, the display panel 750 is sealed to an IP 67 standard. As discussed herein, other ratings are possible.

FIG. 7B illustrates a system diagram schematic of the display panel in accordance with an embodiment of the present invention.

Referring to FIG. 7B, a data and power signal received at the input cable 1360 is processed at an interface circuit 751. The incoming power is provided to the LED driver 753. Another output from the incoming power is provided to the output cable 1365. This provides redundancy so that even if a component in the display panel 750 is not working, the output power is not disturbed. Similarly, the output cable 765 includes all the data packets being received in the input cable 1360.

The interface circuit 751 provides the received data packets to the graphics processor 757 through a receiver bus 754. In some embodiments, the interface circuit 751 provides only the data packets intended for the display panel 750. In other embodiment, the interface circuit 751 provides all incoming data packets to the graphics processor 757. For example, the graphics processor 757 may perform any decoding of the received media. The graphics processor 757 may use the buffer memory 755 or frame buffer as needed to store media packets during processing.

A scan controller 759, which may include an address decoder, receives the media to be displayed and identifies individual LEDs in the LEDs 710 that need to be controlled. The scan controller 759 may determine an individual LEDs color, brightness, refresh time, and other parameters associated to generate the display. In one embodiment, the scan controller 759 may provide this information to the LED driver 753, which selects the appropriate current for the particular LED.

Alternatively, the scan controller 759 may interface directly with the LEDs 710 in one embodiment. For example, the LED driver 753 provides a constant current to the LEDs 710 while the scan controller 759 controls the select line needed to turn ON or OFF a particular LED. Further, in various embodiments, the scan controller 759 may be integrated into the LED driver 753.

Figure 8:
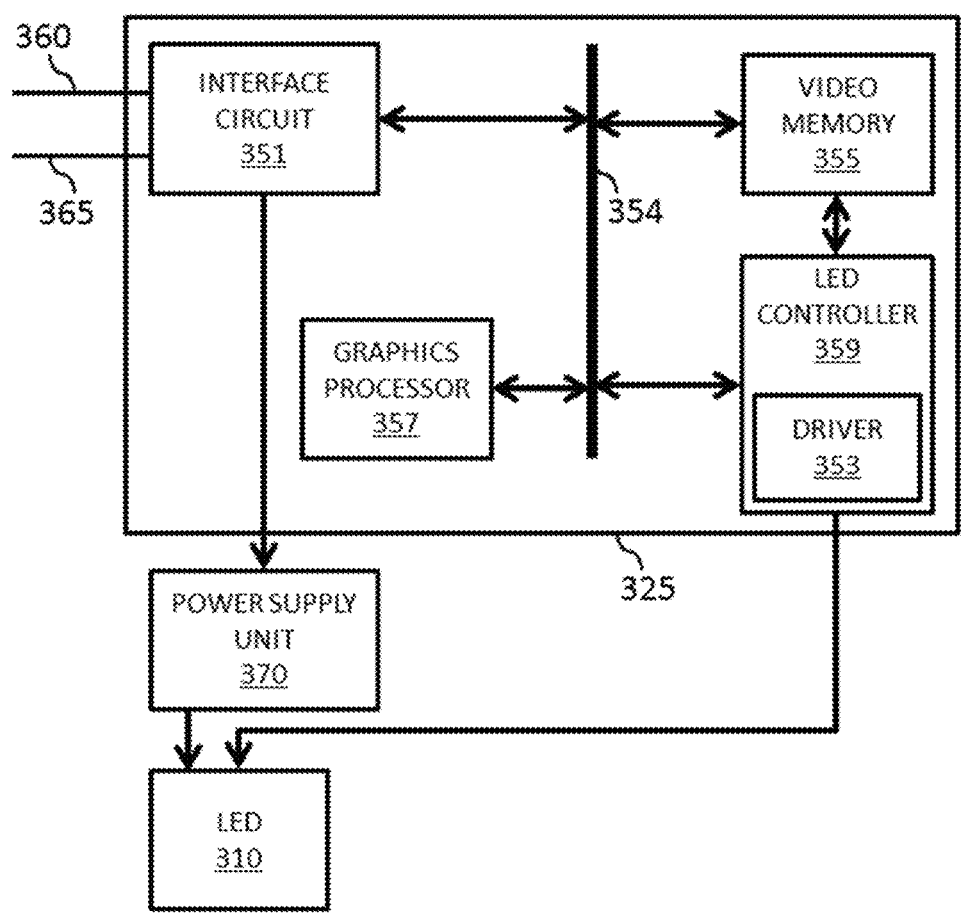
FIG. 8 illustrates an alternative system diagram schematic of the display panel in accordance with an embodiment of the present invention.

FIG. 8 illustrates an alternative system diagram schematic of the display panel in accordance with an embodiment of the present invention.

Referring to FIG. 8, a data and power signal received at first cable 360 is processed at an interface circuit 351 of receiver circuit 325. The incoming power is provided to a power supply unit 370.

Another output from the incoming power is provided to second cable 365. This provides redundancy so that even if a component in the LED display panel 150 is not working, the output power is not disturbed. Similarly, second cable 365 includes all the data being received in first cable 360.

In this embodiment, the interface circuit 351 provides the received data to the graphics processor 357 through a data bus 354. In some embodiments, the interface circuit 351 provides only the data segments intended for the LED display panel 150. In other embodiments, the interface circuit 351 provides all incoming data to the graphics processor 357. For example, the graphics processor 357 may perform any necessary decoding or (when signaling between panels is analog) analog-to-digital conversion of the received media. In other embodiments, the interface circuit 351 interfaces directly with the LED controller 359 without use of a graphics processor 357. In the embodiment of FIG. 3B, the graphics processor 357, LED controller 359, or interface circuit 351 may use the buffer video memory 355 as needed to store video segments during processing. In some embodiments, the buffer video memory 355 may be a component of the LED controller 359. The buffer video memory 355 may also be used to digitally store video segments temporarily until the receiver circuit 325 collects enough data for simultaneous display by the LEDs 310. This collection of data may be a video frame for simultaneous display by all of the LEDs of the display panel, or it may be a smaller portion of data for display by a subset of the LEDs in accordance with, for example, a scanning pattern. The buffer video memory 355 may also be used to temporarily store video segments destined for other display panels.

The LED controller 359, which may include an address decoder (e.g., a demultiplexer), receives the media to be displayed and identifies individual LEDs in the LEDs 310 that need to be controlled. The LED controller 359 may determine an individual LED's color, brightness, refresh time, and other parameters associated to generate the display. For example, at each pixel location in the display, the color of the pixel may be selected by powering one or more combination of red, blue, green, and white LEDs. The LED controller 359 may include control circuitry such as a row selector and column selector for determining LED parameters as an example. In one embodiment, the LED controller 359 may provide these LED parameters to the current driver 353, which acts as either a current source or a current sink to select the appropriate current for the particular LED. In some embodiments, the current driver 353 acts as a current source or sink to provide a constant current with a constant pulse width to the LEDs 310. In other embodiments, the current driver 353 varies the duty cycle of a constant current to pulse width modulate the brightness of the LEDs 310. The current driver 353 may either be a component of the LED controller 359 or may be located outside the LED controller 359, such as, for example, being located inside the power supply unit 370.

The power supply unit 370 may include, for example, a power converter for converting AC to DC, which is supplied to the LEDs 310. Alternatively, the power supply unit 370 may include a down converter that down converts the voltage suitable for driving the LEDs 310.

In one embodiment, the power supply unit includes a scan controller that interfaces directly with the LEDs 310. For example, the current driver 353 may provide a constant current to the LEDs 310 while a scan controller of the power supply unit 370 controls the select line needed to turn ON or OFF a particular LED. In some embodiments, a scan controller of the power supply unit 370 is implemented as an array of switches or transistors that switches incoming power to a selected row or column of LEDs 310. In other embodiments, the scan controller switches the output of the LED controller 359 to a selected row or column. The scan controller switches the LED controller output or power in accordance with, for example, an LED address, a row address, a column address, a pre-configured scanning pattern for scan groups of linked LEDs that should be activated simultaneously, or a scan select signal that specifies which scan group should be activated.

Figure 9:
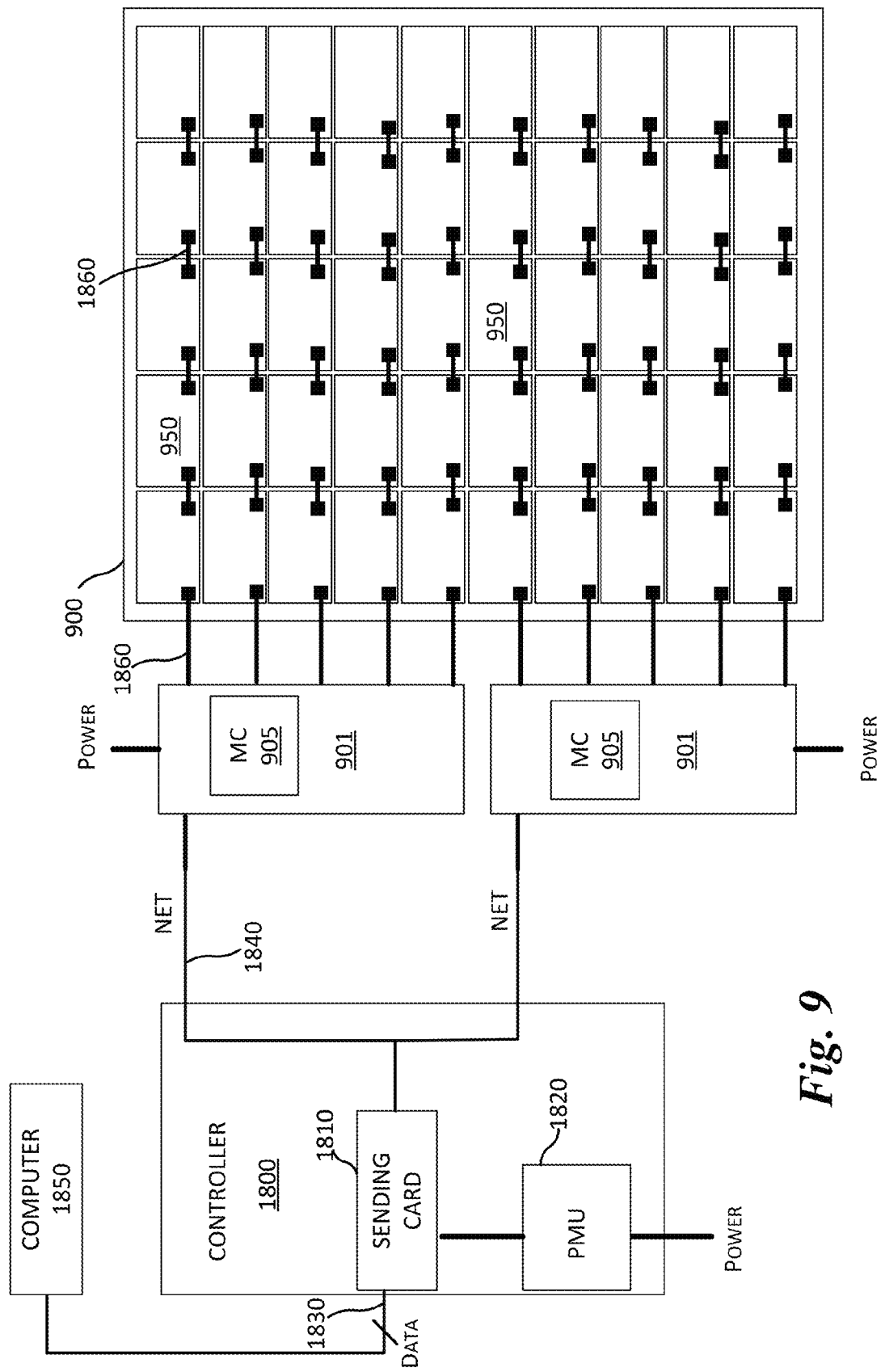
FIG. 9 illustrates an embodiment of the present invention describing a monitoring controller disposed within a data receiver box.

FIG. 9 illustrates an embodiment of the present invention describing a monitoring controller 905 disposed within a data receiver box 901. The monitoring controller 905 is configured to monitor power failure in one or more display panels 950 and report to the computer 1850 or to a different receiving monitoring server. In various embodiments, the monitoring controller 905 is configured to monitor illumination or brightness of one or more panels. The monitoring controller 905 may also monitor the network between the data receiver box 901 and the outside internet including computer 1850 as well as the local area network (or equivalent wireless network) connecting the individual display panels 950 of the display system 900.

The monitoring controller 905 may be used for other purposes as well. For example, in one or more embodiments, the display panels 950 may include one or more sensors to self-regulate operation based on external conditions. For example, the sensor may reduce or increase the brightness of the display panels based on the ambient light. Alternatively, in some embodiments, the display panels may sense the presence of an observer (e.g., human) and modulate the content being displayed. For example, the display may be powered off until a human approaches the display.

Figure 10:
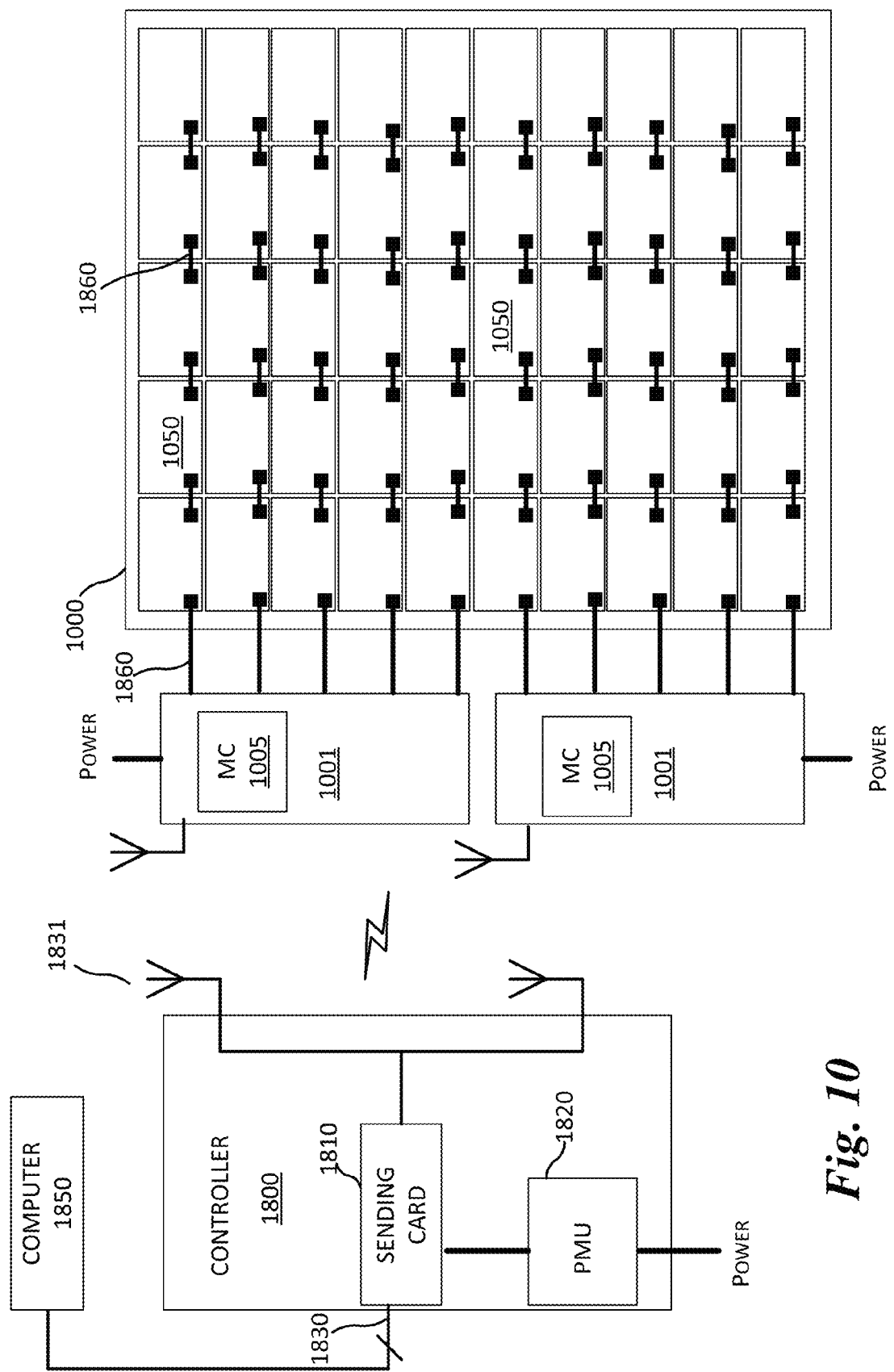
FIG. 10 illustrates an alternative embodiment, in which the data receiver box 1001 also has wireless connectivity.

FIG. 10 illustrates an alternative embodiment, in which the data receiver box 1001 also has wireless connectivity. The data receiver box 1001 may include wired data connection as described in FIG. 9, as well as wireless data connection as illustrated in FIG. 10. Accordingly, for example, if a network failure is detected, the monitoring circuit 1005 may generate an error message, which is then transmitted to a monitoring server or the computer 1850 using the wireless channel.

Figure 11:
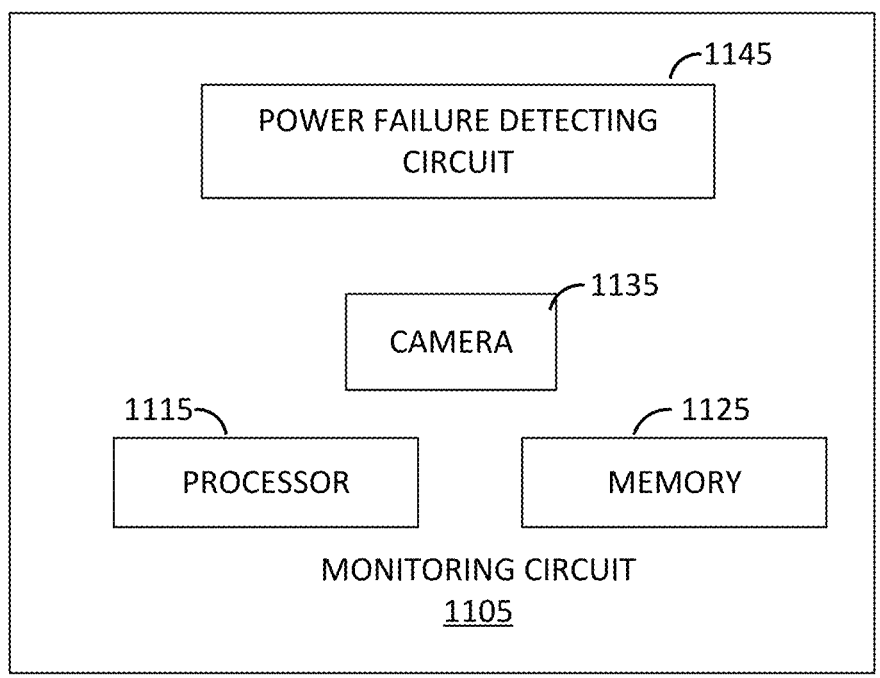
FIG. 11 illustrates a general schematic of a monitoring circuit in accordance with an embodiment of the present invention.

FIG. 11 illustrates a general schematic of a monitoring circuit in accordance with an embodiment of the present invention.

In one or more embodiments, as illustrated in FIG. 11, a monitoring circuit 1105 may include a power failure detecting circuit 1145, a camera 1135, which may include both visible, infrared and other spectrum to collect additional information. The monitoring circuit 1105 may include a processor 1115 or may use the common processor within the data receiver box. The camera may be automatically periodically activated to image the display system. The image may be processed to identify any issues with the display. For example, using an image processing software executing on the processor 1115, the power failure, dark pixels, lowered brightness may be detected. In case of a failure, a failure message is generated and transmitted to a monitoring server.

The monitoring circuit 1105 may include a memory 1125 to store the images and the results of the processing. In one or more embodiments, the monitoring circuit may include only a camera 1135. In one embodiment, the camera 1135 may be a sensor to measure brightness.

The processing may be performed remotely, for example, in some embodiments. The camera 1135 may periodically capture images of the display system and send the unprocessed image to a monitoring server performing the remaining monitoring functions. Accordingly, a more detailed image processing analysis may be performed at the remote media server, which is likely to have better computational power than the on-site processing at the display.

Figure 12:
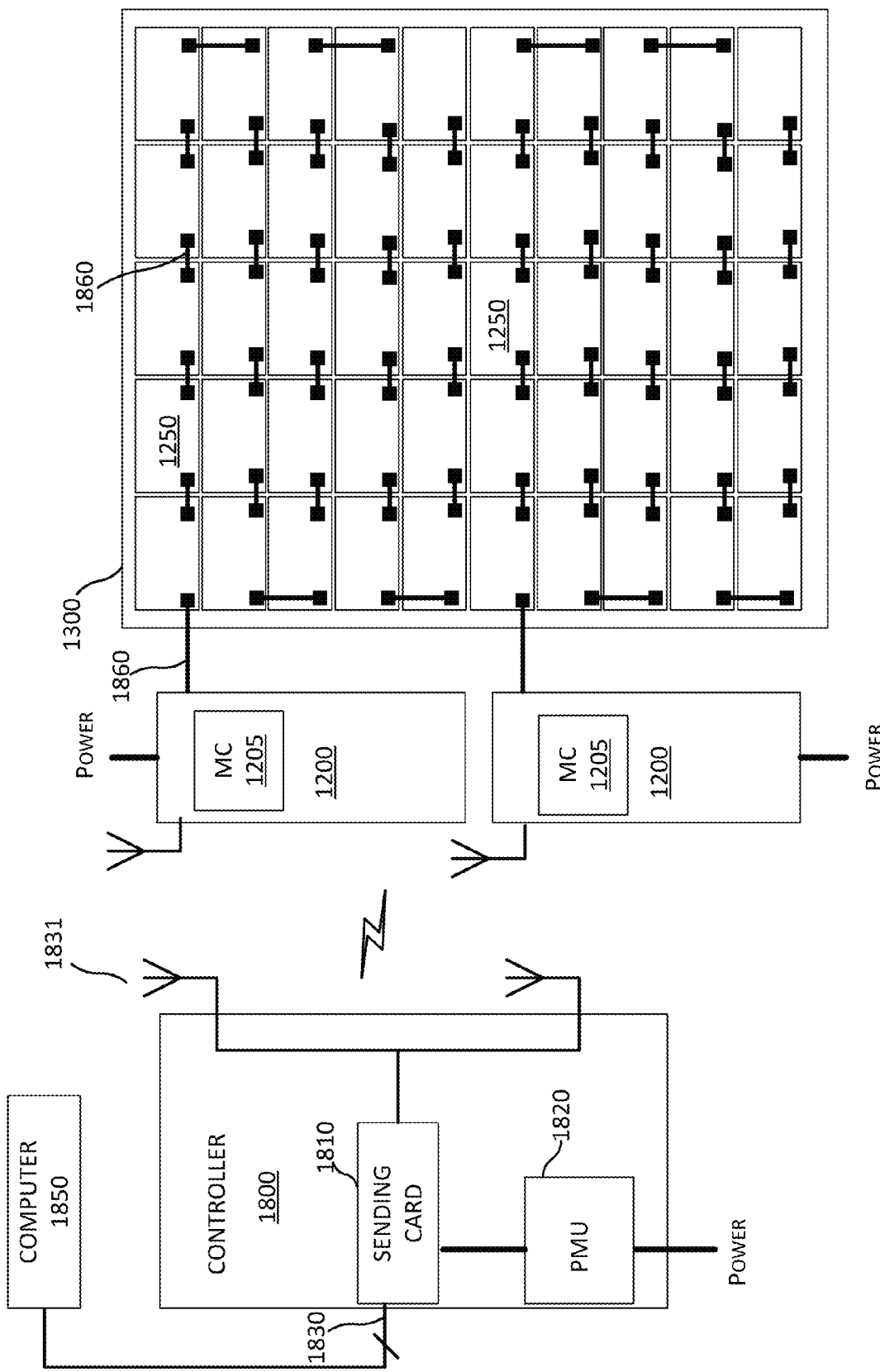
FIG. 12 illustrates an embodiment of the present invention in which the display panels are connected serially.

FIG. 12 illustrates an embodiment of the present invention in which the display panels 1250 are connected serially.

In this embodiment, each individual display panel 1250 includes a media processing chip comprising a network interface card. Thus each panel has an individual media access control (MAC) address, which enables each display panel 1250 to communicate in both directions (receive and send data).

In one or more embodiments, the display panels 1250 may be powered using a serial connection. In this embodiment, the use of a monitoring circuit 1205 within the data receiver box 1200 may be optional because each individual panel may be configured to communicate bidirectionally. Accordingly, the functioning of the monitoring circuit 1205 may be incorporated into the individual panel. For example, each panel 1250 may include software and/or hardware to perform the monitoring functions. If a defect is identified within the panel 1250 (or on an adjacent panel), the panel 1250 communicates the detection of the defect to the controller 1800.

Figure 13A:
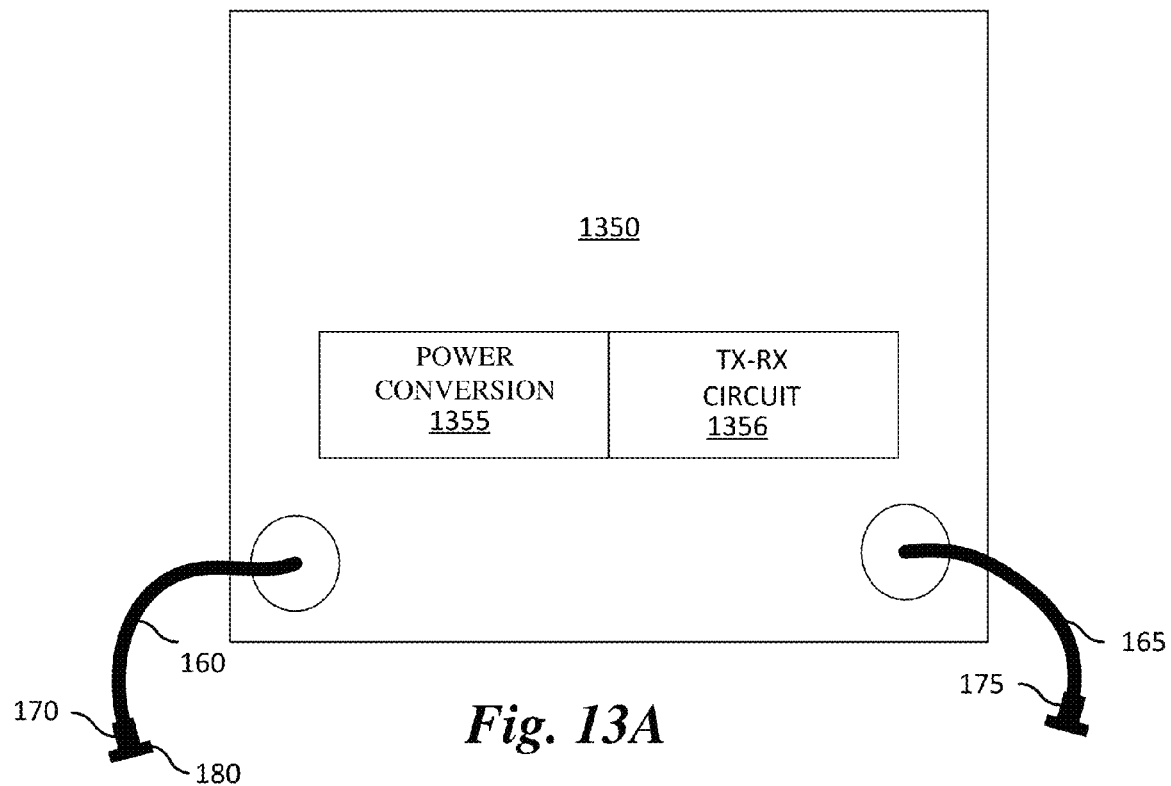
FIG. 13A illustrates a back side of an individual LED display panel in accordance with an embodiment of the present invention.

FIG. 13A illustrates a back side of an individual LED display panel in accordance with an embodiment of the present invention.

Referring to FIG. 13A, in one embodiment, the back side of an individual LED panel 1350 has enclosures for attaching a power conversion unit 1355 and a TX-RX circuit 1356. The TX-RX circuit 1356 may be a media processing chip comprising a network interface controller, for example. In one or more embodiments, the power conversion unit 1355 and the TX-RX circuit 1356 are both placed within separate enclosures and mounted to the back side of the LED display panel 1350. Alternatively, in one embodiment, the power conversion unit 1355 and the TX-RX circuit 1356 are both placed within the same enclosure and mounted to the back side of the LED display panel 1350.

In a further embodiment, the TX-RX circuit 1356 may be incorporated within the panel casing, for example, within the receiver circuit 725 of FIG. 7A or mounted under the PCB 720 of FIG. 7A as a separated chip.

Figure 13B:
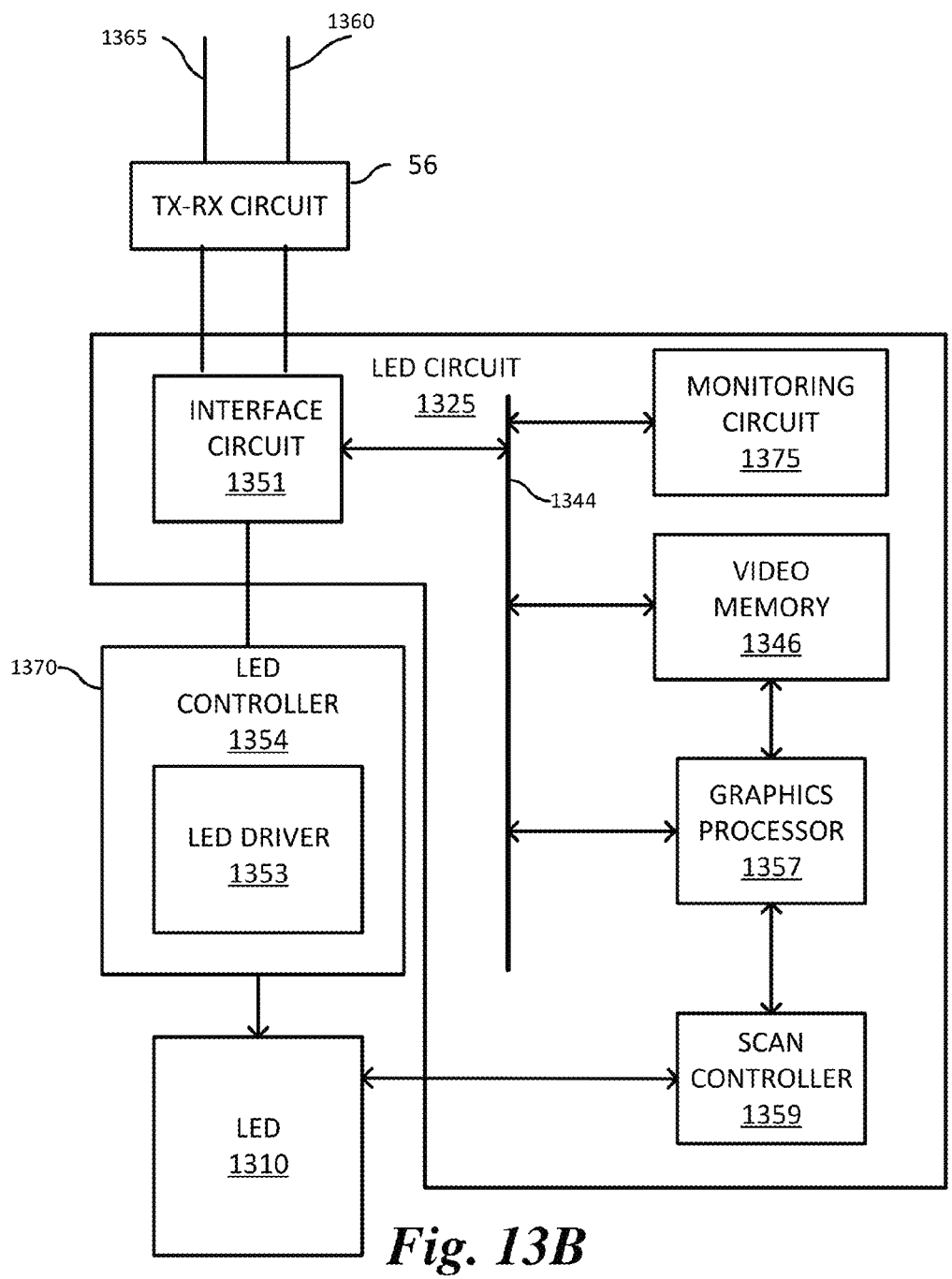
FIG. 13B illustrates a more detailed schematic of the circuit with a LED circuit showing a separate TX-RX circuit for establishing bidirectional communication.

FIG. 13B illustrates a more detailed schematic of the circuit with a LED circuit 1325 showing a separate TX-RX circuit 56 and a monitoring circuit 1375 for monitoring the panel and communicating using the established bidirectional communication. The TX-RX circuit 56 may include a unique MAC address/network card so that the device can be identified. In one or more embodiments, a single media process chip may include, i.e., integrate more than one component. For example, a single media processing chip is used to power and render images using the LED 1310. The media processing chip may include the functions of the TX-RX circuit 56, interface circuit 1351, bus 1344, video memory 1346, graphics processor 1357, scan controller 1359. The LED controller 1354 with the LED driver 1353 may be part of a different chip or may also be integrated.

The monitoring circuit 1375 may be implemented in software and/or hardware and may be instructions to be performed using the graphics processor 1357 or other processor available to the monitoring circuit 1375. The monitoring circuit 1375 may also include sensors such as temperature sensor, optical sensor including ambient light sensor, magnetic sensor, current sensor, power sensor, as well as other sensors. Based on the results from the sensor, the monitoring circuit 1375 determines the need to communicate with the receiver box or with a remote monitoring computer. In one embodiment, an error message is generated by the monitoring circuit 1375 identifying the type of defect and the ID of the panel and then transmitted using the TX-RX circuit 56.

Figure 14:
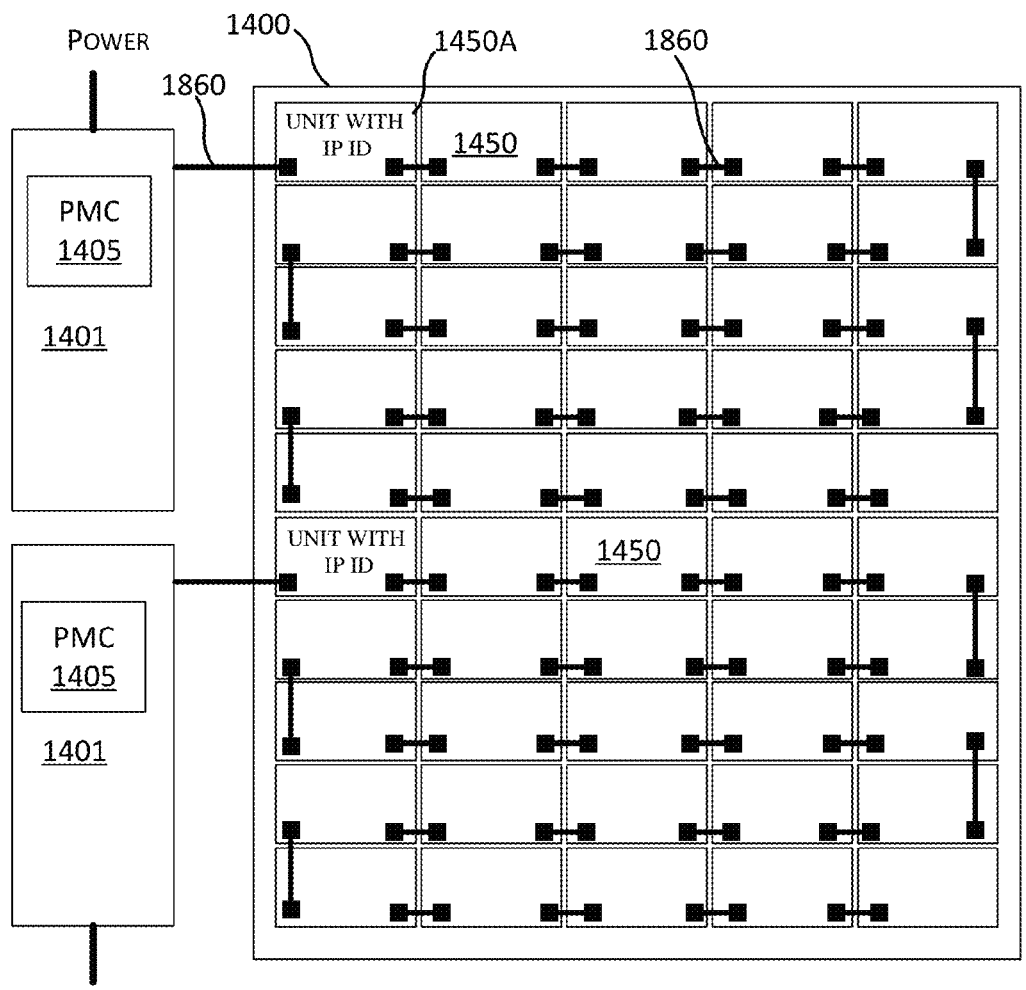
FIG. 14 illustrates an embodiment of the display system in which the data receiver box has minimal functionality.

FIG. 14 illustrates an embodiment of the display system in which the data receiver box 1400 has minimal functionality.

The data receiver box 1401 may simply connect the first display panel of the display system 1400 with an interconnect (TCP/IP) port. The first display panel may include an identifier for the whole system so that the display system advertises a single IP address. For example, the IP address of the display system 1400 may be identified from the first display panel 1450A. The remaining panels 1450 may be daisy chained.

The media processing chip within each display panel 1450 identifies and processes the correct media that is to be displayed from the data stream that includes all the media for all the panels in the chain.

The first panel in the series of panels includes a unique IP address. Thus, when connected to the internet, the network card at the first display panel 1450A receives the data to be displayed by all the panels within the same series. The remaining panels use the data processed through the common network card at the first network. The remaining panels have to be calibrated so that they know which portion of the data is to be displayed by that particular unit.

In one or more embodiments, the first display panel 1450A may include a monitoring circuit for monitoring the status of one or more panels being serviced by the first display panel 1450A.

Figure 15:
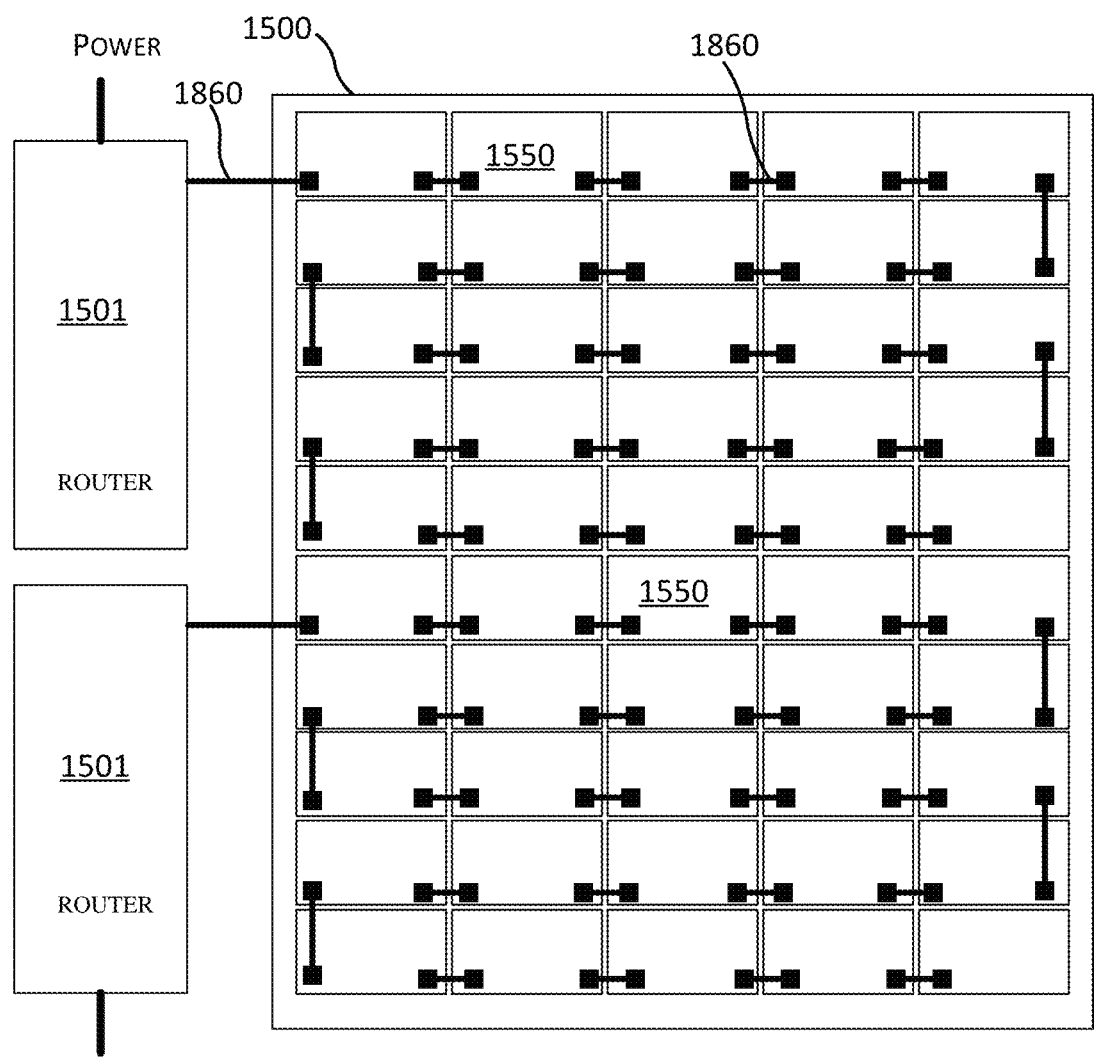
FIG. 15 illustrates an alternative embodiment of the present invention.

FIG. 15 illustrates an alternative embodiment of the present invention.

In this embodiment, a router 1501 is coupled between the display panels 1550 and the internet. The router 1501 may be coupled to a plurality of display panels 1550, where each panel has its own network interface card each thereby having its unique MAC address.

In some embodiments, the first display panel may include the router 1501, i.e., the router 1501 may be integrated into the first display panel. The devices within the local area of the router may now be individually addressed using the display panels' 1550 respective MAC address. Accordingly, packets destined to each panel are routed by the router 1501. In this embodiment, the display panels 1550 within a single display system 1500 may be served from different locations. For example, a larger part of the screen may show an advertisement from a media server whereas a lower portion may show the temperature from a weather server or a sports score from a sport network server.

In one or more embodiments, each of the display panel 1550 may include a monitoring circuit for monitoring the status of one or more panels.

Figure 16:
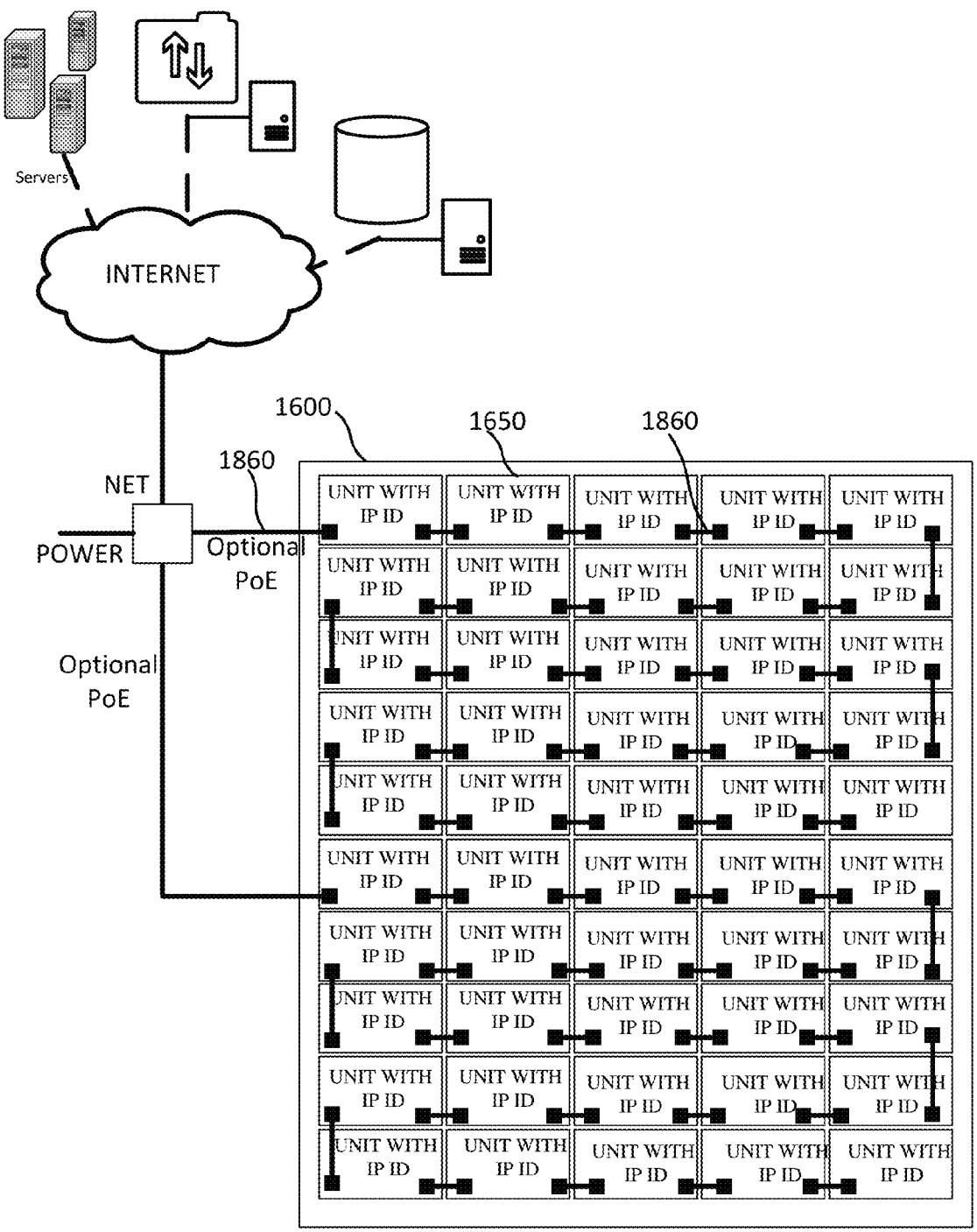
FIG. 16 illustrates an alternative embodiment of the present invention in which each display panel has a unique IPV6 IP address.

FIG. 16 illustrates an alternative embodiment of the present invention in which each display panel has a unique IPV6 IP address.

In this embodiment, each display panel 1650 of the display system 1600 has a unique IP address, for example, an IPV6 IP address. The media to be displayed may be split at the source of a single media server or may be obtained from multiple media server through the internet. For example, different portions of the display system 1600 may be leased to a different company displaying its own content. This embodiment enables multiple users to share a single display board. For example, an expensive display location may be shared in time or space by multiple companies reducing their costs while improving effectiveness of the display. The display panels may be powered individually or through Power over Ethernet technologies using cat5, cat6 cables.

In one or more embodiments, each of the display panel 1650 may include a monitoring circuit for monitoring the status of one or more panels.

Embodiments of the invention provide a display panels, each of which provides a completely self-contained building block that is lightweight. These displays are designed to protect against weather, without a heavy cabinet. The panel can be constructed of aluminum or plastic so that it will about 50% lighter than typical panels that are commercially available. The lightweight design allows for easier installation and maintenance, thus lowering total cost of ownership.

In certain embodiments, the display is IP 67 rated and therefore waterproof and corrosion resistant. Because weather is the number one culprit for damage to LED displays, and IP 67 rating provides weatherproofing with significant weather protection. These panels are completely waterproof against submersion in up to 3 feet of water. In other embodiments, the equipment can be designed with an IP 68 rating to operate completely underwater. In lower-cost embodiments where weatherproofing is not as significant, the panels can have an IP 65 or IP 66 rating.

One aspect takes advantage of a no cabinet design-new technology that replaces cabinets, which are necessary in commercial embodiments. Older technology incorporates the use of cabinets in order to protect the LED display electronics from rain. This creates an innate problem in that the cabinet must not allow rain to get inside to the electronics, while at the same time the cabinet must allow for heat created by the electronics and ambient heat to escape.

Embodiments that the do not use this cabinet technology avoid a multitude of problems inherent to cabinet-designed displays. One of the problems that has been solved is the need to effectively cool the LED display. Most LED manufacturers must use air-conditioning (HVAC) to keep their displays cool. This technology greatly increases the cost of installation and performance.

Displays of the present invention can be designed to be light weight and easy to handle. For example, the average total weight of a 20 mm, 14'×48' panel can be 5,500 pounds or less while typical commercially available panels are at 10,000 to 12,000 pounds. These units are more maneuverable and easier to install saving time and money in the process.

Embodiments of the invention provide building block panels that are configurable with future expandability. These displays can offer complete expandability to upgrade in the future without having to replace the entire display. Installation is fast and easy with very little down-time, which allows any electronic message to be presented more quickly.

In some embodiments, the display panels are "hot swappable." By removing one screw in each of the four corners of the panel, servicing the display is fast and easy. Since a highly-trained, highly-paid electrician or LED technician is not needed to correct a problem, cost benefits can be achieved.

Various embodiments utilize enhanced pixel technology (EPT), which increases image capability. EPT allows image displays in the physical pitch spacing, but also has the ability to display the image in a resolution that is four-times greater. Images will be as sharp and crisp when viewed close as when viewed from a distance, and at angles.

In some embodiments is advantageous to build multipanel displays where each of the LEDs is provided by a single LED manufacturer, so that diodes of different origin in the manufacture are not mixed. It has been discovered that diode consistency can aid in the quality of the visual image. While this feature is not necessary, it is helpful because displays made from different diodes from different suppliers can create patchy inconsistent color, e.g., "pink" reds and pink looking casts to the overall image.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of maintaining a modular multi-panel display that includes a mechanical support structure and a plurality of LED display panels detachably coupled to the mechanical support structure without a cabinet, wherein each LED display panel has a data port that is bidirectionally coupled to at least one other LED display panel and includes a power supply coupled to a power line that extends along a group of the LED display panels, the method comprising:
    monitoring the power supply of each LED display panel;
    determining that an LED display panel of the plurality of LED display panels is a defective LED display panel by determining that the power supply of the defective LED display panel is not providing a power output for powering the defective LED display panel; and
    removing the defective LED display panel by hot swapping the defective LED display panel from the mechanical support structure.

2. The method of claim 1, further comprising:
    electrically disconnecting the defective LED display panel from the multi-panel display;
    placing a replacement LED display panel at a location formerly taken by the defective LED display panel; and
    electrically connecting the replacement LED display panel to the multi-panel display.

3. The method of claim 1, wherein the determining is performed by a monitoring circuitry within a box mounted to the mechanical support structure.

4. The method of claim 1, wherein the determining is performed by circuitry within the defective LED display panel.

5. The method of claim 4, further comprising communicating an error message from the defective LED display panel to a receiver box coupled to each of the LED display panels.

6. The method of claim 4, further comprising communicating an error message from the defective LED display panel to a remotely located monitoring server.

7. The method of claim 1, further comprising monitoring power consumption of each LED pixel in each LED display panel.

8. A method of maintaining a modular multi-panel display that includes a mechanical support structure and a plurality of LED display panels detachably coupled to the mechanical support structure without a cabinet, wherein each LED display panel has a data port that is bidirectionally coupled to at least one other LED display panel, the method comprising:
    monitoring each of the plurality of LED display panels;
    determining that a defective LED display panel has a defective LED pixel based upon a result of the monitoring, wherein the monitoring and determining is performed by a monitoring circuitry comprising a power failure detecting circuit and a camera, wherein the monitoring comprises periodically activating the camera to capture an image and processing the image, and wherein the determining comprises identifying a dark pixel, wherein a dark pixel is a pixel having a lower brightness than an associated brightness to be displayed for the pixel; and
    removing the defective LED display panel by hot swapping the defective LED display panel from the mechanical support structure.

9. The method of claim 8, further comprising:
    electrically disconnecting the defective LED display panel from the multi-panel display;
    removing an attachment plate from the defective LED display panel;
    removing the defective LED display panel from the multi-panel display;
    placing a replacement LED display panel at a location formerly taken by the defective LED display panel;
    attaching the attachment plate to the replacement LED display panel; and
    electrically connecting the replacement LED display panel to the multi-panel display.

10. The method of claim 8, wherein the determining is performed by circuitry within the defective LED display panel.

11. The method of claim 10, further comprising communicating an error message from the defective LED display panel to a receiver box coupled to each of the LED display panels.

12. The method of claim 10, further comprising communicating an error message from the defective LED display panel to a remotely located monitoring server.

13. The method of claim 8, wherein, at the monitoring circuit, identifying from the image if brightness of a panel of the plurality of LED display panels is less than a predetermined threshold.

14. The method of claim 8, wherein, determining that a defective LED display panel has a defective LED pixel comprises, at the monitoring circuit, identifying from the image if a panel of the plurality of LED display panels has more number of dark pixels than a predetermined threshold for dark pixels.

15. The method of claim 8, wherein the determining is further performed by measuring power consumption of the plurality of LED display panels, and computing a change in power consumption of the plurality of LED display panels, wherein the power consumption is a total power consumed by all of the plurality of LED display panels.

16. The method of claim 8, wherein the determining is further performed by measuring power consumption of the plurality of LED display panels, and computing a change in power consumption of the plurality of LED display panels, and wherein the power consumption is a total power consumed by each of the plurality of LED display panels.

17. The method of claim 8, further comprising:
    generating an operational data of the plurality of LED display panels; and
    sending the operational data from the monitoring circuit to a monitoring server.

18. The method of claim 17, further comprising identifying if a communication network to one or more of the plurality of LED display panels is defective or slow and report the results into the operational data.

19. The method of claim 8, wherein the determining is further performed by using an image captured using a temperature sensor facing the plurality of LED display panels.

20. The method of claim 19, wherein the temperature sensor comprises an infrared sensor.

21. A method of maintaining a modular multi-panel display, the method comprising:

electronically monitoring each of a plurality of light emitting diode (LED) display panels by using bidirectional communication with a network interface card having a unique Internet Protocol (IP) address inside each of the LED display panel, wherein each of the plurality of LED display panels is individually attached to a common frame, wherein the plurality of LED display panels is attached to the frame without cabinets, wherein each of the plurality of LED display panels includes a power supply coupled to a power line that extends along a group of the LED display panels;

during operation of the modular multi-panel display, electronically identifying a LED display panel is a defective LED display panel by determining that the power supply of the identified LED display panel is not providing a power output for powering the defective LED display panel; and removing the defective LED display panel by hot swapping the defective LED display panel from the common frame.

22. The method of claim 21, wherein removing the defective LED display panel by hot swapping further comprises:

electrically disconnecting the defective LED display panel from the multi-panel display;

removing the defective LED display panel from the multi-panel display;

placing a replacement LED display panel at a location formerly taken by the defective LED display panel; and electrically connecting the replacement LED display panel to the multi-panel display.

23. The method of claim 21, wherein the determining is performed by a monitoring circuitry within a box mounted to the common frame.

24. The method of claim 21, wherein the determining is performed by circuitry within the defective LED display panel.

25. The method of claim 24, further comprising communicating an error message from the defective LED display panel to a receiver box coupled to each of the LED display panels.

26. The method of claim 24, further comprising communicating an error message from the defective LED display panel to a remotely located monitoring server.

27. The method of claim 21, further comprising monitoring power consumption of each LED pixel in each LED display panel.

28. The method of claim 21, further comprising removing the identified LED display panel from the frame without removing any of the other plurality of LED display panels from the frame.

* * * * *